United States Patent [19]

Sakai et al.

[11] Patent Number: 5,023,774
[45] Date of Patent: Jun. 11, 1991

[54] DATA I/O TRANSACTION METHOD AND SYSTEM

[75] Inventors: Naohumi Sakai, Yokohama; Masashi Tsuchida, Tokyo; Kazuhiko Ohmachi, Kawasaki; Yasuhiro Imai, Hadano; Toshio Honma, Yokohama, all of Japan

[73] Assignees: Hitachi Software Engineering Co., Ltd.; Hitachi Ltd., both of Tokyo, Japan

[21] Appl. No.: 268,810

[22] Filed: Nov. 8, 1988

[30] Foreign Application Priority Data

Nov. 13, 1987 [JP] Japan ............................ 62-285604

[51] Int. Cl.$^5$ .............................................. G06F 1/00
[52] U.S. Cl. ................................. 364/200; 364/254.3; 364/243
[58] Field of Search ... 364/200 MS File, 900 MS File

[56] References Cited

U.S. PATENT DOCUMENTS

| | | | |
|---|---|---|---|
| 4,489,378 | 12/1984 | Dixon et al. | 364/200 |
| 4,638,424 | 1/1987 | Beglin et al. | 364/200 |
| 4,672,537 | 6/1987 | Katzman et al. | 364/200 |
| 4,771,391 | 9/1988 | Blasbalg | 364/200 |
| 4,812,968 | 3/1989 | Poole | 364/200 |

Primary Examiner—James W. Moffitt
Assistant Examiner—Rebecca L. Rudolph
Attorney, Agent, or Firm—Fay, Sharpe, Beall, Fagan, Minnich & McKee

[57] ABSTRACT

After passing through the process in which the number of one page I/O requests generated in a certain unit time period, the number of multiple pages I/O requests, and the number of pages required at each of the multiple pages I/O request are input, the quantity of the I/O requests generated in the above-described unit time period is calculated in accordance with the thus-input values. The unit (the number of pages) for a multiple pages I/O actually performed by one time operation of the I/O control device corresponding to the multiple pages I/O request from users is determined in accordance with the user's instruction or specific criterion for the system based on the result of the above-described calculation, the performance of the CPU, the performance of the I/O control device, the performance of the DASD (Direct Access Storage Decive), and to which DASD each of I/O requests corresponds. The result of this determination is employed as the unit (the number of pages) for the multiple pages I/O performed by one time operation of the I/O control device. In case of the specific criterion for the system, the structure may be constituted in such a manner that it can be automatically changed in accordance with the state of change in the quantity of the I/O request.

9 Claims, 3 Drawing Sheets

DATA I/O TRANSACTION METHOD AND SYSTEM

BACKGROUND OF THE INVENTION

1. Field of the Invention

This invention relates to data I/O transaction method capable of transacting the mixture of one page I/O requests and a multiple-page I/O request, and, more particularly, to a data I/O transaction method and system including a multiple-pages I/O method which is suitably used when a high speed response to one page I/O request is needed.

2. Description of the Prior Art

For example, a computer system for transacting bank deposit works needs to be provided with a region for storage programs or data. In general, a high speed semiconductor memory is used to serve as the main storage device. However, with increment of the programs and data, a method has been widely used in which a cheap direct access storage device (abbreviated to "DASD" hereinafter) such as a magnetic disk is also used as a compliment to an expensive semiconductor memory serving as the main storage device so that the storing system thereof is made hierarchic such that programs or data is input from the DASD to the main storage device at needs. However, such computer system suffers from a problem that the DASD has a poor transacting speed with respect to a central processing unit (abbreviated to "CPU" hereinafter) and the overhead of its CPU used for I/O transaction cannot be negligible. In order to overcome the above-described problems, a multiple pages I/O transaction was invented. The multiple pages I/O transaction is a transaction capable of reducing the overhead of the CPU thereof by I/O transacting multiple pages corresponding to one I/O request as an alternative to the transaction in which I/O transaction is performed by one page unit. It is the transaction capable of shortening the seeking time or searching time over the DASD on which multiple pages of data to be input/output are physically adjacent, wherein the word "page" represents the minimum unit, the word "one page I/O" represents an I/O of one page, and the word "multiple pages I/O" represents an I/O exceeding one page. This multiple pages I/O transaction leads to a fact that the throughput of such CPUs can be improved.

In general, the time required for transacting multiple pages is in proportion to the number of pages transacted by one multiple pages I/O transaction. Therefore, the transacting time takes a longer time in accordance with increment of pages to be transacted in one transaction. In the above-type of conventional technology, such number of pages is fixed as predetermined regardless of the quantity of the I/O request.

However, in the above-described type of bank deposit operation, the number of requests generated for a unit time period in an ON-LINE transaction (one page I/O) usually tends to be changed in accordance with the period of time in a day. If an ON-LINE I/O request (one page I/O request) to the DASD is generated after a massive (the number of pages is great) multiple pages I/O transaction has been started in the same specific DASD, execution of transacting this one page I/O request needs to be waited until the time at which the preceding one multiple-page transaction is completed (two I/O transactions cannot be performed simultaneously). Therefore, a problem arises that the response to the ON-LINE I/O request becomes excessively poor. Such time delay generated in execution of transacting the ON-LINE I/O request becomes larger in the period of time in which the number of ON-LINE I/O requests for a unit time period are great, and the more the number of pages to be in one multiple pages I/O transacted. The number of I/O requests (frequency) generated in one system for a unit time period changes greatly between the busy time period and the slack time period. For example, a system to which requests are generated at an average of 10 to 20 clock periods in the busy time period in the daytime is changed in its period to a second unit in the nighttime.

However, in the above-described type of the conventional technology, the unit when the multiple pages I/O transaction is performed as described above is fixed. Therefore, any regard is not paid for determining this unit so as to make this unit correspond to the change in the number of one page I/O requests for a unit time period in accordance with the period of time in a day.

SUMMARY OF THE INVENTION

To this end, an object of the present invention is to overcome the above-described problems experienced with the conventional technology and to improve the throughput of a CPU by performing a multiple pages I/O transaction. In addition, it is another object of the present invention to provide high speed response to the ON-LINE I/O request by reducing the waiting time for the execution of the same by making the quantity of the multiple pages I/O transaction to be actually performed correspond to the number OF THE ON-LINE I/O requests (the number of one page requests).

The quantity of I/O requests generated in a predetermined certain unit time period is counted based on the number of one page I/O requests generated in said predetermined certain unit time period, the number of multiple pages I/O requests generated in said predetermined certain unit time period, and the number of pages for each of the multiple pages I/O requests;

the unit of multiple pages I/O corresponding to the multiple pages I/O request from users and performed by one time operation of an I/O control device in accordance with the result of the calculation in such a manner that said unit is decreased when the number of the one page I/O requests is increased, while it is increased when the same is decreased; and actual I/O transaction is performed by said multiple pages I/O unit determined by said determination.

Next, the operation according to the above-described structure will now be described.

The unit (the number of pages) for multiple pages I/O transacted by one time operation of the I/O control device can be flexibly changed in such a manner that, for example, if the number of the one page I/O requests for a unit time period is large, the same becomes smaller (the number of pages for multiple pages I/O becomes smaller) in accordance with the period of time in a day, while the same becomes larger if the number of the one page I/O requests is small. The actual transaction corresponding to the one page I/O request is executed immediately after the precedent one time transaction of the multiple pages I/O transaction has been completed. As a result of this, regardless of the periods of time in a day in which the number of the one page I/O requests for a unit time period is larger or smaller, the actual transaction queue with respect to one page I/O request can be shortened and high speed response can be achieved.

The foregoing and other objects, advantages, manner of operation and novel features of the present invention will be understood from the following detailed description when read in connection with the accompanying drawings.

DETAILED DESCRIPTION OF THE PREFERRED EMBODIMENT

In the preferred embodiment of the present invention, the above-described unit time period is determined by an instruction from users or as a specific one for the system. On the viewpoint of the efficiency of the computer system, the smaller the number of calculations of the quantity of the I/O requests for a unit time period, the better. Therefore, the longer the unit time period, the better. However, it is arranged to be capable of being determined by user's instruction in order to correspond to the transaction pattern change in accordance with the type of the utilization way by the users. Furthermore, in accordance with the system, such unit time period can be automatically flexibly changed such that, if the number of one page I/O becomes large, the ensuring unit time is shortened.

It is capable of reflecting the user's instruction to the determination of the above-described multiple pages I/O unit. For example, a user that performing ON-LINE I/O requests can instruct the response time causing the shortest possible waiting time within the user's tolerance. The computer system which receives this instruction can determine the multiple pages I/O unit that can meet the user's request as possible within the transacting capability thereof individually from the result of the above-described calculation (or considering also the result of the above-described calculation).

The one page I/O requests and the multiple page I/O requests generated during the unit time period are executed during the ensuring unit time period.

As described above, the more the number of one page I/O requests for a unit time period in the nearest precedent unit time period, the smaller the unit for the multiple pages I/O becomes, while the smaller the number, the greater the unit becomes. However, as for the number of the nearest precedent multiple pages I/O requests and the number of the pages of the same, it needs to be determined to be such that the larger the multiple pages requests and the number of the pages, the larger the same needs to be determined, while the smaller the multiple pages I/O requests and the number of the pages, the smaller the same needs to be determined. Therefore, the quantity of the above-described I/O which is based upon the above-described one page I/O requests, the number of multiple pages I/O requests, and the number of the pages for each of the multiple pages I/O needs to be calculated considering this fact.

As described above, the multiple pages I/O unit can be determined at the precedent system performance design in the data base system involving a rather small load change therein. On the other hand, in the system in which the precedent system design is difficult to be performed, it is important that the multiple pages I/O unit can be determined corresponding to this change. Such flexibility also can be obtained.

An embodiment of the present invention will now be described with reference to the accompanying drawings.

Figure 1:
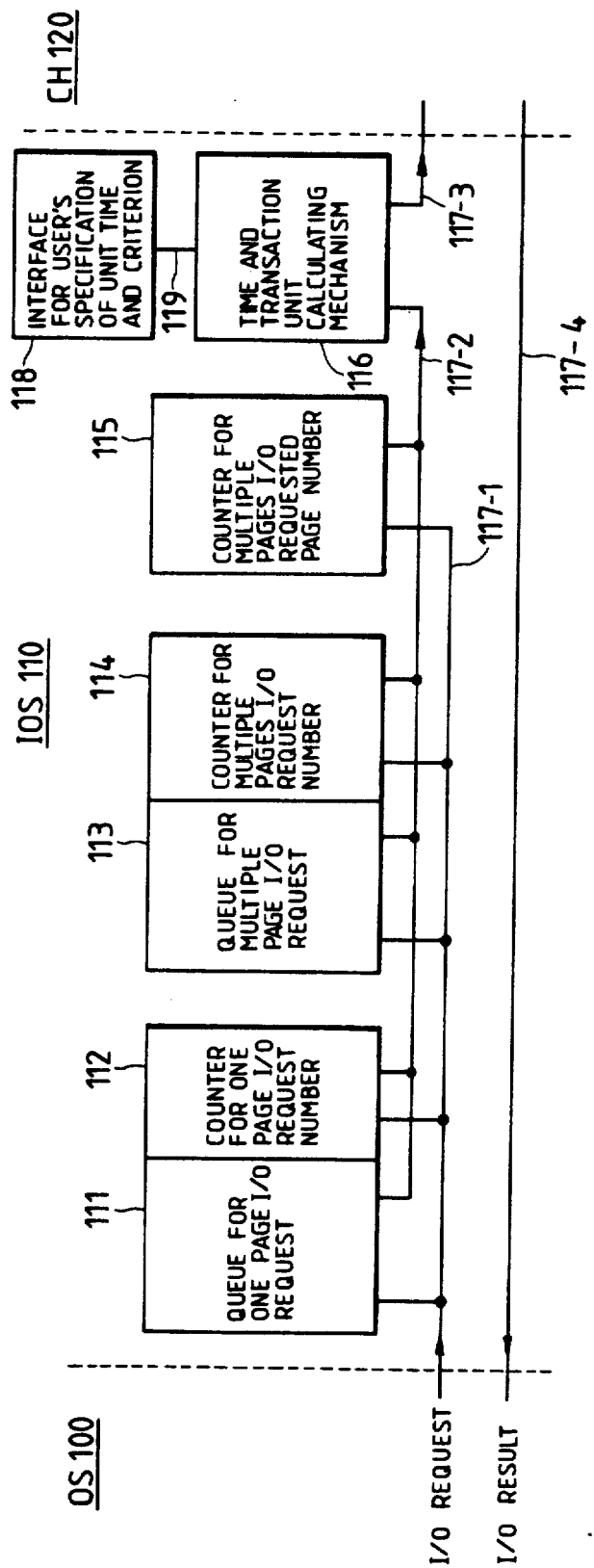
FIG. 1 is a structural view illustrating a case where a data I/O transaction system according to the present invention is applied to an IOS.
Figure 2:
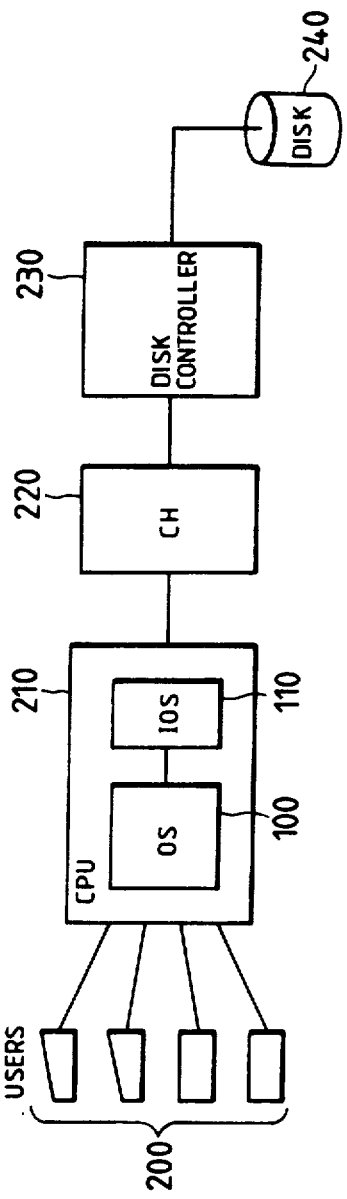
FIG. 2 is a structural view illustrating a computer system to which the system according to the present invention is subjected.

FIG. 2 is a computer system to which the present invention is subjected. An I/O request generated due to transaction request to a CPU 210 from users 200 is transferred from an operating system (abbreviated to "OS" hereinafter) 100 to an input/output superviser (abbreviated to "IOS" hereinafter )110. The IOS 110 converts the I/O request from the OS 100 into channel command word (abbreviated to "CCW" hereinafter) which can be executed by a channel (abbreviated to "CH" hereinafter ) 220 and it supplies it to the CH 220. The CH 220 receives the CCW and issues a command to a disk controller 230 so as to make a disk 240 perform actual I/O. In a computer system shown in FIG. 2, the mechanism according to the present invention is realized by the IOS 110. The IOS 110 needs to comprise the elements shown in FIG. 1 in order to realize the mechanism according to the present invention. That is, the IOS according to this embodiment comprises: a queue for one page I/O request 111; a counter for one page I/O request number 112; a queue for multiple pages I/O request 113; a counter for multiple pages I/O request number 114; a counter for multiple pages I/O requested page number 115; a time and transaction unit calculating mechanism 116; lines connecting the above-described elements 117-1, 117-2, 117-3, and 117-4; an interface for user's specification of unit time and criterion 118; and lines 119. The counter for one page I/O request number 112 and the counter for multiple pages I/O request number 114 are each made increment by one whenever one page I/O request and multiple pages I/O request are generated. The counter for multiple pages I/O requested page number 115 counts the total sum of the number of pages at the time of the individual multiple I/O requests are generated. Therefore, for example, when a multiple pages I/O request over 10 pages and a multiple pages I/O request over 15 pages are generated, the value displayed on the counter for multiple pages I/O requested page number 115 becomes 25. The time and transaction unit calculating mechanism 116 inputs and resets each of the values of the counter for one page I/O request number 112, the counter for multiple pages I/O request number 114, the counter for multiple pages I/O requested page number 115 every unit time period instructed by users or which is a specific one for the system. Therefore, the unit (the number of the pages) for the multiple pages I/O to be actually performed is determined in accordance with the user's instruction or the specific criterion of the system.

Figure 3:
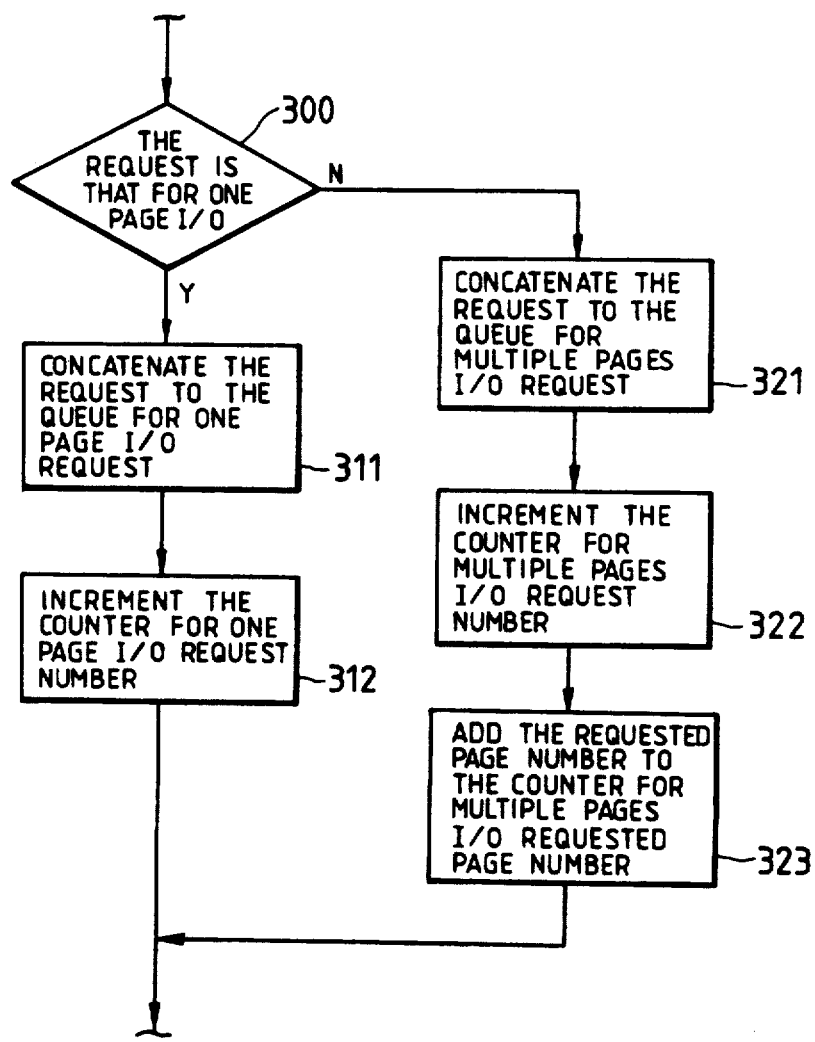
FIG. 3 is a flow chart for use in an IOS transaction when the I/O request from an OS is received.
Figure 4:
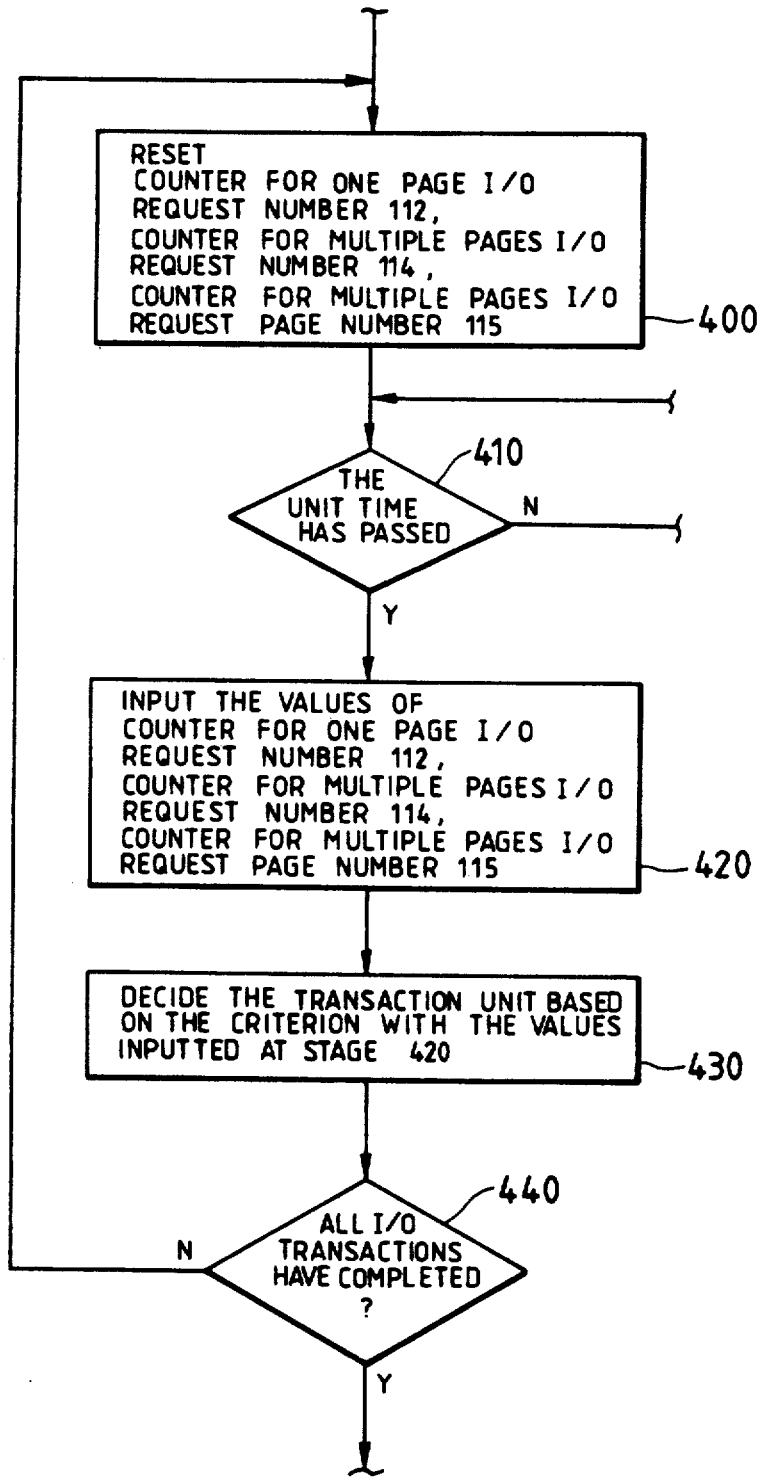
FIG. 4 is a flow chart for use in time counters and a transaction unit calculating mechanism in the IOS.

FIG. 3 illustrates the flow of the transaction in the IOS 110 when an I/O request from the OS 100 is received. FIG. 4 illustrates the flow of the transaction in the time and transaction unit calculating mechanism 116 in the IOS 110. Referring to FIG. 3, the IOS 110 examines a fact that the received I/O request is whether a one page I/O request or a multiple pages I/O request (300). The IOS 110 concatenates the request to a queue one page I/O request 111 if it is the one page I/O request (311), so that the counter for one page I/O request number 112 is incremented (312). It concatenates the request to a queue for multiple pages I/O request 113 (321) if it is the multiple pages request, so that the counter for multiple pages I/O request number 114 is incremented (322), and it adds the required pages to the counter for multiple pages I/O requested page number 115 (323). Referring to FIG. 4, the time and transaction unit calculating mechanism 116 first resets, before starting its calculation, the counter for one page I/O request number 112, the counter for multiple pages I/O request number 114, and the counter for multiple pages I/O requested page number 115 (400). Next, it examines whether the unit time period has been elapsed or not (410). The control may be shifted to other portion between the examination whether the unit time period has been elapsed or not and the time point at which the next examination is performed. After the unit time period has been elapsed, each value of the counter for one page I/O request number 112, the counter for multiple pages I/O request number 114, and the counter for multiple pages I/O requested page number 115 is input (420). Then, in accordance with the criterion, the unit (the number of pages) for a multiple pages I/O to be executed to the ensuring process is determined (430).

For example, if the value displayed on the counter 112 is smaller than that displayed on the counter 114 in a certain period of time, the unit of the above-described multiple pages I/O becomes the value obtained by dividing the value displayed on the counter 115 by the value displayed on the counter 112. On the other hand, the value displayed on the counter 112 equals with or exceeds the value displayed on the counter 114, the above-described unit is made as it is that corresponds to the required number of the pages. If the disk control devide includes an OFF-LINE function, the unit for the multiple pages I/O request is made as it is. Furthermore, the flow is made based on the criterion such that if the performance of the computer exceeds 4 MIPS and the total sum of the seeking time and the searching time of the disk device exceeds 50 ms, the above-described unit is made the required number of pages as it is. If no transaction of the I/O request is performed due to stop of the computer or the like, the flow moves away from the transaction in the time and transaction unit calculating mechanism 116. If the I/O request is continued, the transaction starting from the process 400 is repeated.

In the above-described embodiment, the mechanism according to the present invention is realized by a software acting on a CPU. However, it can be realized on a control program of the I/O control device. Furthermore, the mechanism according to the present invention can be realized with a system of a hardware constituted by a plurality of processors. The mechanism according to the present invention and the algorithm capable of preferentially scheduling the transaction of a one page I/O request may be combined. In this case, a further significant effect can be obtained.

For example, when a multiple pages request is generated during the I/O request which has been queued at the time at which one page I/O request is generated, the queue is changed so as to execute this one page I/O request prior to the multiple page I/O request. On the other hand, in a case where the unit of multiple pages is devided, transaction for each of the units are assumed that they are the transactions corresponding to the individual multiple pages, so that the above-described type of prior multiple pages I/O request is performed.

As in detail described above, with the data I/O transaction system according to the present invention, the multiple page I/O transaction is performed in a computer system so as to improve the throughput of the CPU. Furthermore, in proportion to increment of the number of the ON-LINE requests (the number of I/O requests) for a unit time period, the unit of multiple pages I/O transaction by one time transaction actually performed by the I/O control device is arranged to be reduced. As a result of this, the one time multiple pages I/O transaction can be completed in a short time, and the transaction which corresponds to the ON-LINE I/O request can be immediately executed. As a result of this, high speed response to the ON-LINE I/O request can be made assuredly. Furthermore, since the mechanism realizing the present invention is sufficiently simple, causing for the overhead of the mechanism of the present invention can be reduced. The above-described excellent effects can be obtained.

We claim:

1. A data I/O transaction system comprising:
    means for counting an accumulated quantity of I/O requests generated in a predetermined certain unit time period based on a number of one page I/O requests generated in said predetermined certain unit time period, an accumulated number of multiple pages I/O requests generated in said predetermined certain unit time period, and a number of pages for each of the multiple pages I/O requests;
    means for dynamically changing and fixing said number of pages for a multiple pages I/O request in correspondence with a multiple pages I/O request from a user in accordance with said accumulated quantity, said accumulated number and said number of pages counted by said counting means in such a manner that said number of pages is decreased when the accumulated quantity is increased, while it is increased when the accumulated quantity is decreased; and
    means capable of actually performing I/O transactions of said one page I/O requests and said multiple pages I/O requests by said changing and fixing means.

2. A data I/O transaction system according to claim 1, further comprising:
    means for inputting said predetermined certain unit time period by a specification instructed by a user, wherein said specification can be changed during the operation of said system.

3. A data I/O transaction system according to claim 1, wherein said unit time period is automatically determined, as a specific unit time period to improve the performance speed of said transaction system.

4. A data I/O transaction system according to claim 1, further comprising:
    means for determining said number of pages for said multiple pages I/O request by a specification given by a user.

5. A data I/O transaction system according to claim 1, further comprising:
    means for determining said number of pages for said multiple pages I/O request in accordance with a specific criterion of said transaction system, wherein said criterion is determined based on the accumulated quantity, the accumulated number, the performance speed of a central processing unit, the performance speed of an I/O control device, and the performance speed of said I/O device, and wherein said I/O request is performed to said I/O device.

6. A data I/O transaction system according to claim 1, wherein said means for counting comprises:
   means for counting said unit time period according to a specification instructed by a user;
   means for inputting the accumulated number of one page I/O requests, the accumulated number of multiple pages I/O requests, and the number of pages for each of said multiple pages I/O requests; and
   means for calculating the performance speed of the I/O requests in said unit time period based on the thus-input values.

7. A data I/O transaction system according to claim 1, wherein said accumulated quantity of one page I/O request comprises:
   accumulated number of pages of the one page I/O request and the time required to transact said I/O request.

8. A data I/O transaction system according to claim 1, wherein said means capable of actually performing the I/O transaction comprises:
   means for employing a number of pages for multiple pages I/O requests derived from said accumulated quantity of the one page I/O requests and said criterion.

9. A data I/O transaction method comprising:
   a step for counting an accumulated quantity of I/O requests generated in a predetermined certain unit time period based on a number of one page I/O requests generated in said unit time period, an accumulated number of multiple pages I/O requests generated in said unit time period, and a number of pages required at each of said multiple pages I/O requests;
   a step for dynamically changing and fixing said number of pages for a multiple pages I/O request in correspondence with a multiple pages I/O request from a user in accordance with said accumulated quantity, said accumulated number and said number of pages counted by said counting step in such a manner that said number of pages is decreased when the accumulated quantity is increased while the number of pages is increased when the accumulated quantity is decreased; and
   a step capable of actually performing the I/O transactions of said one page I/O requests and said multiple page I/O requests by said changing and fixing step.

* * * * *